United States Patent
Yim et al.

(10) Patent No.: US 9,247,609 B2
(45) Date of Patent: Jan. 26, 2016

(54) APPARATUS AND METHOD FOR CONTROLLING FLASH IN PORTABLE TERMINAL

(75) Inventors: Sung-Geun Yim, Suwon-si (KR); Jae-Hyoun Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 996 days.

(21) Appl. No.: 13/413,380

(22) Filed: Mar. 6, 2012

(65) Prior Publication Data

US 2012/0293092 A1 Nov. 22, 2012

(30) Foreign Application Priority Data

May 20, 2011 (KR) .................. 10-2011-0047732

(51) Int. Cl.
*G03B 15/05* (2006.01)
*H05B 33/08* (2006.01)
*H05B 37/02* (2006.01)

(52) U.S. Cl.
CPC ............ *H05B 33/0854* (2013.01); *G03B 15/05* (2013.01); *H05B 37/0227* (2013.01); *H05B 37/0245* (2013.01)

(58) Field of Classification Search
CPC ............... G03B 15/05; H05B 33/0854; H05B 37/0227; H05B 37/0254
See application file for complete search history.

(56) References Cited

U.S. PATENT DOCUMENTS

| 7,684,693 | B2 | 3/2010 | Kawada | |
|---|---|---|---|---|
| 2009/0085502 | A1* | 4/2009 | Geris et al. | 315/308 |
| 2010/0213842 | A1* | 8/2010 | Geris | 315/33 |

FOREIGN PATENT DOCUMENTS

| KR | 10-0622920 | 9/2006 |
|---|---|---|
| KR | 10-2007-0063982 | 6/2007 |

* cited by examiner

*Primary Examiner* — WB Perkey

(57) ABSTRACT

A method and an apparatus for control a flash in a mobile terminal. In the method, a current use state of the mobile terminal is detected. A use amount of a current of the flash is controlled depending on the current use state. The flash is allowed to emit light depending on the controlled amount of the current.

20 Claims, 3 Drawing Sheets

APPARATUS AND METHOD FOR CONTROLLING FLASH IN PORTABLE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on May 20, 2011 and assigned Serial No. 10-2011-0047732, the entire disclosure of which is hereby incorporated by reference.

TECHNICAL FIELD OF THE INVENTION

The present invention relates to a mobile terminal. More particularly, the present invention relates to an apparatus and method for controlling a consumption current of a flash.

BACKGROUND OF THE INVENTION

Recently, most of provided mobile terminals provide a flash function using a Light Emitting Diode (LED). The flash function performs a function of giving an aid in facilitating image capturing of the mobile terminal or securing a user's clear view by providing light using the LED under an environment where brightness is a threshold or less.

In the conventional mobile terminal, a large amount of a current is consumed for the flash function, i.e., light emission of the flash. Due to the large amount of current consumption, an abnormal operation frequently occurs to the mobile terminal. For example, when the flash emits light while the mobile terminal is in communication, since a current for light emission of the flash is additionally consumed under a circumstance where a large amount of a current is consumed for the communication, an abnormal operation occurs from the mobile terminal due to an excessive amount of current consumption.

SUMMARY OF THE INVENTION

To address the above-discussed deficiencies of the prior art, it is a primary object to provide at least the advantages described below. Accordingly, an aspect of the present disclosure is to provide a method and an apparatus for controlling current consumption of a flash in a mobile terminal.

Another aspect of the present disclosure is to provide a method and an apparatus for controlling current consumption of a flash by detecting a data communication state in a mobile terminal.

Still another aspect of the present disclosure is to provide a method and an apparatus for controlling current consumption of a flash depending on a residual amount of a battery in a mobile terminal.

Yet another aspect of the present disclosure is to provide a method and an apparatus for controlling current consumption of a flash depending on a battery temperature in a mobile terminal.

Further yet another aspect of the present disclosure is to provide a method and an apparatus for limiting an amount of a current used upon flash emission depending on an amount of current consumption in a mobile terminal.

In accordance with an aspect of the present disclosure, a method for controlling a flash in a mobile terminal is provided. The method includes detecting at least one of whether communication traffic exists and a battery temperature, controlling a use amount of a current of the flash based on the detection result, and emitting flash light depending on the controlled amount of the current.

In accordance with another aspect of the present disclosure, an apparatus for controlling a flash in a mobile terminal is provided. The apparatus includes a controller for detecting at least one of whether communication traffic exists and a battery temperature, and controlling a use amount of a current of the flash based on the detection result, and a Light Emitting Diode (LED) for emitting light depending on the controlled amount of the current.

Other aspects, advantages and salient features of the disclosure will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
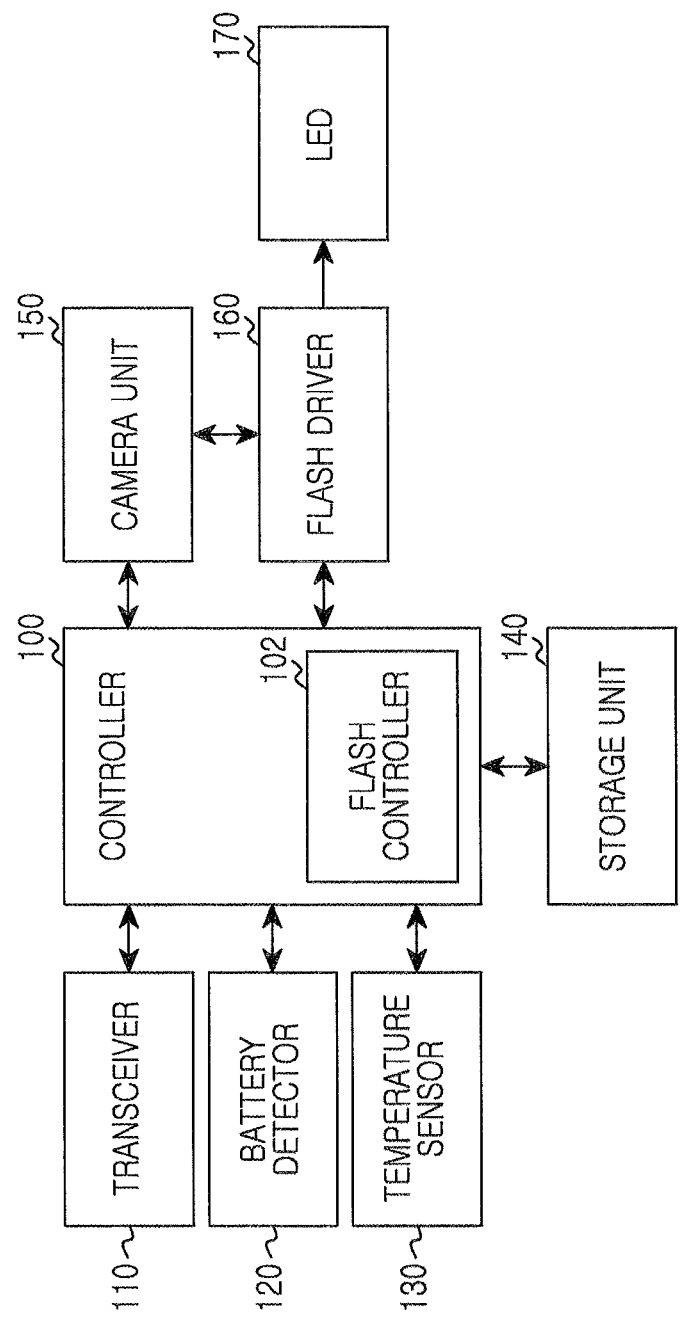
FIG. 1 illustrates a mobile terminal according to an exemplary embodiment of the present disclosure; and FIGS. 2A
Figure 2A:
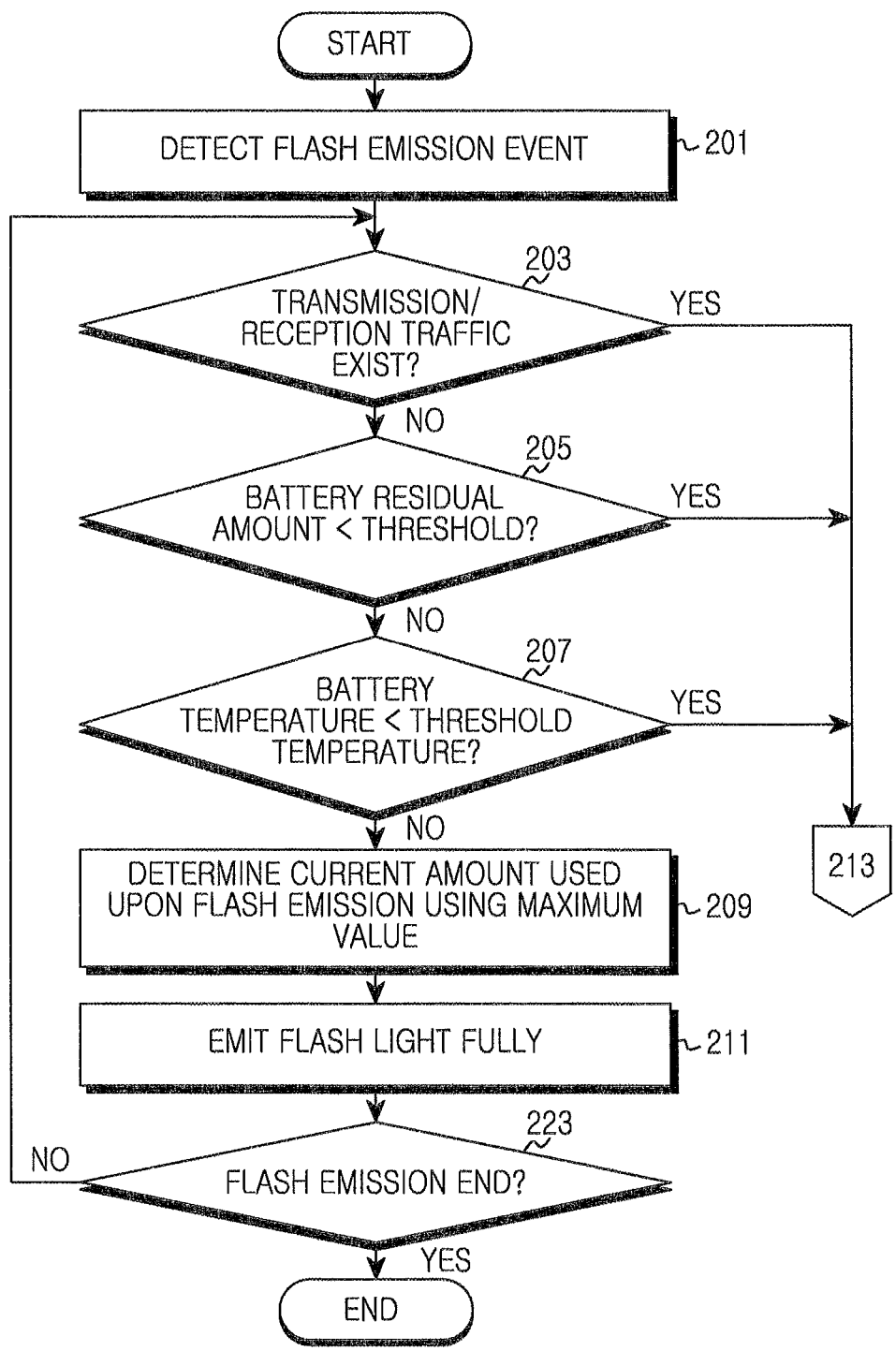
FIG. 2B illustrates a procedure for controlling current consumption of a flash in a mobile terminal according to an exemplary embodiment of the present disclosure.
Figure 2B:
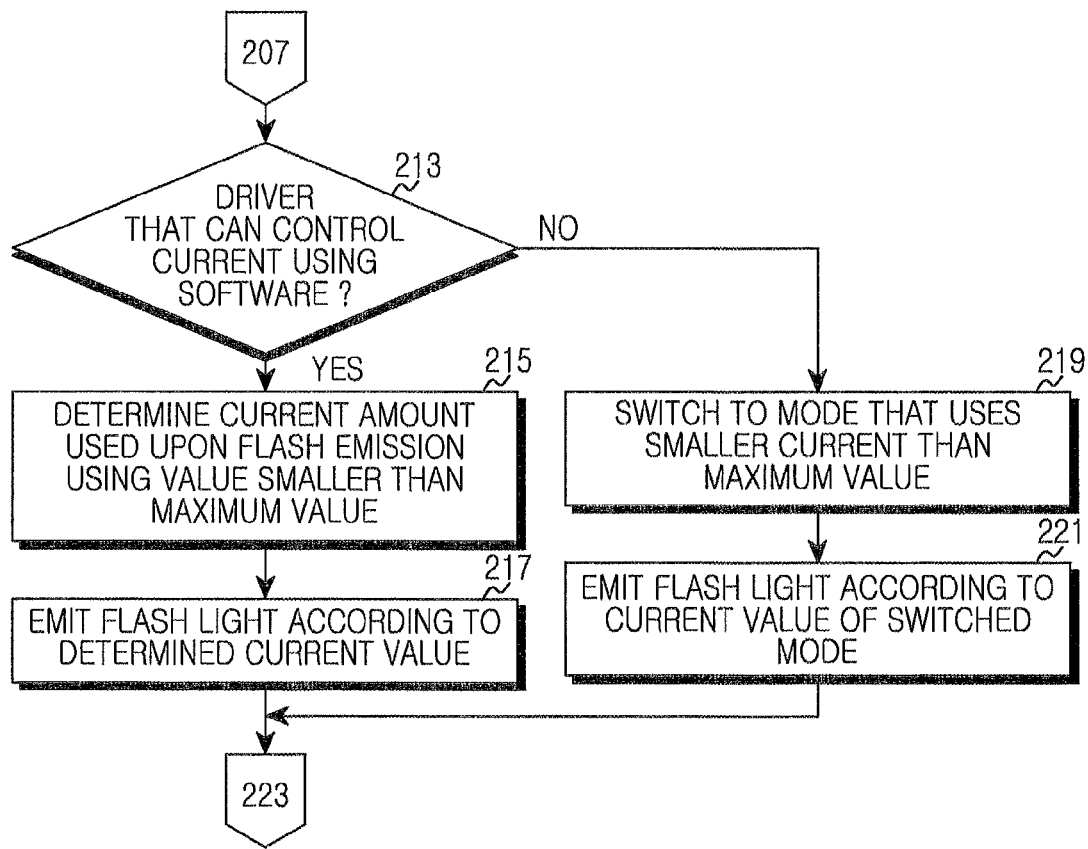

FIGS. 1 through 2B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present disclosure provide a method and an apparatus for controlling current consumption of a flash in a mobile terminal. Here, the mobile terminal denotes all electronic devices enabling data communication and having a flash function. For example, a mobile terminal according to an exemplary embodiment of the present disclosure includes a mobile communication terminal.

FIG. 1 is a block diagram illustrating a mobile terminal according to an exemplary embodiment of the present disclosure.

Referring to FIG. 1, the mobile terminal includes a controller 100, a transceiver 110, a battery detector 120, a temperature sensor 130, a storage unit 140, a camera unit 150, a flash driver 160, and a Light Emitting Diode (LED) 170. More particularly, the controller 100 includes a flash controller 102.

The controller 100 controls and processes an overall operation of the mobile terminal. More particularly, the controller 100 performs a function for controlling an amount of current consumption upon flash emission when a flash emission event occurs by including the flash controller 102.

The flash controller 102 controls an amount of a current used when the flash emits light with consideration of a data communication state of the mobile terminal, a residual amount of a battery, and a battery temperature. That is, the flash controller 102 detects at least one of a current amount in use and an available current amount of the mobile terminal. When the current amount in use is less than a threshold and the available current amount is greater than the threshold, the flash controller 102 determines a current amount used upon flash emission using a predetermined maximum value. When the current amount in use is greater than the threshold or the available current amount is less than the threshold, the flash controller 102 controls a current amount used upon flash emission to an arbitrary value smaller than the maximum value. Here, the maximum value denotes a current amount used upon full flash emission, and may be determined in advance depending on a design scheme and the characteristic of the LED 170. In addition, the arbitrary value smaller than the maximum value may be set as a predetermined value during design. In addition, a threshold compared with the current amount in use and a threshold compared with the available current amount may be the same, or different from each other.

In detail, the flash controller 102 determines a data communication state of the transceiver 110 (i.e., whether communication traffic exists). When the communication traffic does not exist, the flash controller 102 determines a current amount used upon flash emission using the maximum value set in advance. When the communication traffic exists, the flash controller 102 determines a current amount used upon flash emission using a value smaller than the maximum value. Here, whether the communication traffic exists denotes whether a data packet that is being processed by the transceiver 110 exists. Whether the communication traffic exists may be recorded in the storage unit 140 by the controller 100 constantly or periodically. That is, the controller 100 determines a packet size represented by the transceiver 110. When the packet size increases, the flash controller 102 records that the communication traffic exists in the storage unit 140. When the packet size does not increase and maintains the same value, the flash controller 102 records that the communication traffic does not exist. Accordingly, the flash controller 102 may determine whether the communication traffic exists via the storage unit 140. Here, controlling a current amount used upon flash emission depending on whether the communication traffic exists is for preventing the flash from emitting light fully while processing the communication traffic and so preventing current consumption from rapidly increasing, for a large amount of a current used for processing the communication traffic is consumed.

In addition, the flash controller 102 detects a residual amount of the battery via the battery detector 120, and compares the battery residual amount with a predetermined battery threshold. When the battery residual amount is equal to or greater than the battery threshold, the flash controller 102 determines a current amount used upon flash emission using the maximum value, When the battery residual amount is less than the battery threshold, the flash controller 102 determines the current amount used upon flash emission using a value less than the maximum value. Here, the residual amount of the battery may be recorded in the storage unit 140 constantly or periodically under control of the controller 100. The flash controller 102 may control an amount of a current used upon flash emission with reference to the battery residual amount recorded in the storage unit 140. Here, controlling the amount of the current used upon flash emission depending on the battery residual amount is for preventing a current from being rapidly consumed due to full emission of the flash when the battery residual amount is less than the threshold, and so preventing the mobile terminal from abnormally operating, or preventing a usable time of the mobile terminal from reducing.

In addition, the flash controller 102 detects the temperature of the battery via the temperature sensor 130, and compares the temperature of the battery with a predetermined threshold temperature. When the temperature of the battery is equal to or greater than the threshold temperature, the flash controller 102 determines an amount of a current used upon flash emission using the maximum value. When the temperature of the battery is smaller than the threshold temperature, the flash controller 102 determines an amount of a current used upon flash emission using a value smaller than the maximum value. Here, the temperature of the battery may be recorded in the storage unit 140 constantly or periodically under control of the controller 100. The flash controller 102 may control an amount of a current used upon flash emission with reference to the battery temperature recorded in the storage unit 140. Here, controlling the amount of the current used upon flash emission depending on the battery temperature is for preventing the performance of the battery from deteriorating when the battery temperature is less than the threshold temperature. When a current is rapidly consumed due to full emission of the flash under this circumstance, the mobile terminal abnormally operates.

When a current amount used upon flash emission is determined, the flash controller 102 controls the camera unit 150 or the flash driver 160 to perform a function for controlling a current amount. That is, the flash controller 102 requests the camera unit 150 to switch to a mode where current consumption used upon flash emission is lower, or requests the flash driver 160 to set a current value used upon flash emission. In example embodiments where the flash driver 160 cannot control an amount of a current used via software, the flash controller 102 requests the camera unit 150 to switch a mode. In example embodiments where the flash driver 160 can control the amount of current used via software, the flash controller 102 requests the flash driver 160 to set a current value used upon flash emission to a value smaller than the maximum value.

In addition, the flash controller 102 continuously detects a data communication state of the mobile terminal, the battery residual amount, and the battery temperature during the flash emission to continuously control a current amount used upon flash emission.

The transceiver 110 transmits/receives a signal to/from an external device under control of the controller. More particularly, the transceiver 110 determines the size of a transmitted/received packet under control of the controller 100 and provides the same to the controller 100.

The battery detector 120 detects a voltage residual amount of a battery (not shown) mounted on the mobile terminal and provides the same to the controller 100. The battery detector 120 measures the voltage residual amount of the battery periodically and provides the measured battery residual amount to the controller 100.

The temperature sensor 130 detects the temperature of the battery and provides the same to the controller 100.

The storage unit 140 stores various programs for an overall operation of the mobile terminal and data. More particularly, the storage unit 140 stores whether communication traffic exists, the battery residual amount, and the battery temperature under control of the controller 100. Whether communication traffic exists, the battery residual amount, and the battery temperature are updated constantly or periodically under control of the controller 100.

The camera unit 150 has a camera sensor (not shown) to capture an image under control of the controller 100 and provides the captured image to the controller 100. When a capture event occurs, the camera unit 150 determines whether flash emission is requested under control of the controller 100. When determining that the flash emission is requested, the camera unit 150 informs the controller 100 that the flash emission is requested and may request the flash driver 160 to emit flash light. At this point, when a full emission mode is requested or mode switching is not requested by the flash controller 102, the camera unit 150 requests the flash driver 160 to operate in a full emission mode for emitting flash light at the predetermined maximum value. In contrast, when the mode switching is requested by the flash controller 102, the camera unit 150 requests the flash driver 160 to operate in a torch mode where current consumption used upon flash emission is small. Here, the torch mode is a mode for emitting flash light for a predetermined time or more to secure a user's view instead of fully emitting flash light instantaneously for image capturing. That is, the torch mode denotes a mode for emitting flash light using only a smaller current (for example, a current amount corresponding to 70%~80% of the maximum value) than the predetermined maximum value. Here, though the torch mode has been described as an example for convenience in description, the flash driver 160 may switch to a different mode for emitting flash light using only a smaller current than the predetermined maximum value.

The flash driver 160 controls the light emission of the LED 170 according to a request from the flash controller 102 or the camera unit 150. The flash driver 160 sets a current amount used upon flash emission under control of the controller 120, and controls the light emission of the LED 170 according to the set current amount. That is, the flash driver 160 sets a current amount used upon flash emission to a maximum value under control of the flash controller 102 to control the LED 170 to emit light fully, or sets a current amount used upon flash emission to a value smaller than the maximum value to control the LED 170 to emit light according to the set current amount. In addition, when an operation in a full emission mode is requested from the camera unit 150, the flash driver 160 controls the LED 170 to emit light fully. When an operation in a torch mode is requested from the camera unit 150, the flash driver 160 controls the LED 170 to emit light using a predetermined current amount smaller than the maximum value.

The LED 170 performs a function of generating light according to a current amount provided under control of the flash driver 160. When a maximum current is provided from the flash driver 160, the LED 170 emits light fully, i.e., generates brightest light that can be generated from the LED 170. When a current less than the maximum value is provided from the flash driver 160, the LED 170 may generate light of brightness lower than that of full emission.

FIG. 2A and FIG. 2B are flowcharts illustrating a procedure for controlling current consumption of a flash in a mobile terminal according to an exemplary embodiment of the present disclosure.

Referring to FIG. 2A and FIG. 2B, the mobile terminal proceeds to step 201 to detect generation of a flash emission event. The flash emission event may be generated when a flash function is selected by a user's menu manipulation. Also, the flash event may be generated according to ambient brightness and photographing configuration during an operation of a camera application.

The mobile terminal determines whether communication traffic exists in step 203. Here, determining whether the communication traffic exists is for preventing the flash from emitting light fully when the communication traffic exists because a large amount of a current is consumed in order to process the communication traffic.

When the communication traffic exists, the mobile terminal determines not to emit flash light fully to proceed to step 213. In contrast, when the communication traffic does not exist, the mobile terminal proceeds to step 205.

The mobile terminal detects a residual amount of the battery and determines whether the battery residual amount is smaller than a predetermined battery threshold in step 205. Here, determining whether the battery residual amount is smaller than the predetermined battery threshold is for preventing the mobile terminal from emitting flash light fully when the battery residual amount is smaller than the threshold. When emitting flash light fully in the state where the battery residual amount is small, the power of the mobile terminal may be turned off or an available time may rapidly reduce.

When the battery residual amount is smaller than the threshold, the mobile terminal determines not to emit the flash light fully to proceed to step 213. In contrast, when the battery residual amount is equal to or greater than the threshold, the mobile terminal proceeds to step 207.

The mobile terminal detects the temperature of the battery and determines whether the battery temperature is smaller than a predetermined threshold temperature in step 207. Here, determining whether the battery temperature is smaller than the predetermined threshold temperature is for preventing the performance of the battery from deteriorating when the temperature of the battery is low. When the flash emits light fully at the low temperature, the mobile terminal may abnormally operate due to rapid current consumption. To prevent this, the mobile terminal controls the flash not to emit light fully when the battery temperature is lower than the threshold temperature.

When the battery temperature is lower than the threshold temperature, the mobile terminal determines not to emit the flash light fully to proceed to step 213. In contrast, when the battery temperature is equal to or greater than the threshold temperature, the mobile terminal proceeds to step 209.

The mobile terminal determines a current used upon flash emission using the maximum value in step 209, and proceeds to step 211 to supply a current amount corresponding to the determined maximum value to the LED 170 to allow the LED 170 to emit flash light fully.

Meanwhile, the mobile terminal proceeds to step 213 to determine whether the flash driver provided to the mobile terminal can control a current using software. Here, whether the flash driver can control a current using software may be determined depending on a model or type of the flash driver.

When the flash driver can control a current using software, the mobile terminal sets a current amount used upon flash emission to a smaller value than the predetermined maximum value in step 215, and proceeds to step 217 to provide a current to the LED 170 via the flash driver according to the set value and allow the LED 170 to emit light.

In contrast, when the flash driver cannot control a current in a software manner, the mobile terminal switches to a mode that uses a current smaller than the maximum value when emitting flash light in step 219, and supplies a current to the LED 170 according to a current value of the switched mode to allow the LED 170 to emit light in step 221. Here, examples of a mode that uses a smaller current than the maximum value when emitting flash light include a torch mode. The torch mode is a mode for emitting flash light for a predetermined time or more to secure a user's clear view instead of fully emitting flash light instantaneously for image capturing. That is, the torch mode denotes a mode for emitting flash light using only a smaller current (for example, a current amount corresponding to 70%~80% of the maximum value) than the predetermined maximum value.

The mobile terminal proceeds to step 223 to determine whether the flash emission ends. Here, in the example where emission of the flash is for instant image capturing, the mobile terminal allows the flash to emit light instantly and then determines that the flash emission ends. Also, when a flash function end menu is selected by a user, the mobile terminal may determine that the flash emission ends.

When the flash emission does not end, the mobile terminal returns to step 203 to re-perform subsequent steps. When the flash emission ends, the mobile terminal ends the present algorithm.

Though the present disclosure controls an amount of a current used upon flash emission depending on whether the mobile terminal is in data communication by paying attention to the fact that a large current is consumed during data communication in general in the above description, an amount of a current used upon flash emission may be controlled depending on an entire current amount used by the mobile terminal. For example, an amount of current consumption of the mobile terminal is measured at a point where flash emission is requested in the mobile terminal, and when the amount of current consumption is equal to or greater than a threshold, an amount of a current used upon flash emission may be limited.

In addition, an amount of a current used upon flash emission may be determined depending on an amount of current consumption in the mobile terminal. For example, when an amount of entire current consumption at a current point is greater than a predetermined first threshold and smaller than a second threshold, the mobile terminal may determine an amount of a current used upon flash emission as a current amount A. When the amount of the current consumption is greater than the second threshold and smaller than a third threshold, the mobile terminal may determine an amount of a current upon flash emission as a current amount B.

In addition, though an amount of a current used upon flash emission has been directly controlled in the above description, an emission degree of the flash, i.e., a brightness value is set and the flash is allowed to emit light according to the set brightness, so that the mobile terminal may control an amount of a current used upon flash emission.

The present disclosure prevents a mobile terminal system from abnormally operating due to rapid current consumption upon flash emission by limiting an amount of a current used upon flash emission using at least one of a data communication state, a battery residual amount, and a battery temperature in a mobile terminal, so that the mobile terminal system may be stably operated.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for controlling a flash in a mobile terminal, the method comprising:
   detecting at least one of whether communication traffic is present and a battery temperature to form a detection result;
   controlling an amount of a current to be used for the flash based on the detection result;
   determining whether to use a predetermined maximum current value for the flash based on the battery temperature; and
   emitting a flash light depending on the controlled amount of the current.

2. The method of claim 1, further comprising:
   detecting a battery residual amount,
   wherein when controlling the amount of the current to be used for the flash comprises:
      controlling the amount of the current used for the flash based on the battery residual amount.

3. The method of claim 1, wherein controlling the amount of the current to be used for the flash comprises:
   when the communication traffic is not present, determining the amount of the current to be used for the flash using the predetermined maximum value; and
   when the communication traffic is present, determining the amount of the current to be used for the flash using a value less than the maximum value.

4. The method of claim 2 further comprising:
   when detecting the battery residual amount, comparing the battery residual amount with a predetermined threshold,
   wherein controlling the amount of the current to be used for the flash comprises:
      when the battery residual amount is equal to or greater than the predetermined threshold, determining the amount of the current to be used for the flash using the predetermined maximum value; and when the battery residual amount is less than the predetermined threshold, determining the amount of the current to be used for the flash using a value less than the maximum value.

5. The method of claim 1 further comprising:
when detecting the battery temperature, comparing the battery temperature with a predetermined threshold temperature,
wherein controlling the amount of the current to be used for the flash comprises:
when the battery temperature is equal to or higher than a predetermined threshold temperature, determining the amount of the current to be used for the flash using the predetermined maximum value; and
when the battery temperature is lower than the predetermined threshold temperature, determining the amount of the current to be used for the flash using a value smaller than the maximum value.

6. The method of claim 1, wherein controlling the amount of the current used for the flash comprises:
determining the amount of the current to be used for the flash based on the detection result; and
setting the amount of the current of the flash to a flash driver.

7. The method of claim 1, wherein controlling the amount of the current to be used for the flash comprises:
determining an operation mode of the flash based on the detection result; and
operating in the determined flash operation mode at a flash driver,
wherein the flash operation mode comprises at least one of a full emission mode for emitting flash light using a current corresponding to the predetermined maximum value and a torch mode for emitting flash light using a current corresponding to a value less than the maximum value.

8. The method of claim 1, wherein detecting the at least one of whether communication traffic is present and the battery temperature comprises:
detecting the presence of the communication traffic to measure a total amount of current used by the mobile terminal.

9. The method of claim 1, wherein controlling the amount of the current used for the flash comprises:
comparing an amount of a current used by the mobile terminal with a predetermined threshold current amount; and
determining the amount of the current to be used for the flash depending on the comparison result.

10. The method of claim 1, wherein controlling the amount of the current to be used for the flash comprises:
determining whether a flash driver for the flash in the mobile terminal can control the amount of the current to be used for the flash;
when the flash driver can control the amount of the current to be used for the flash, setting the amount of the current to be used for the flash using the flash driver; and
when the flash driver cannot control the amount of the current to be used for the flash, changing an operation mode of the flash to control the amount of the current to be used for the flash.

11. An apparatus configured to control a flash in a mobile terminal, the apparatus comprising:
a controller configured to detect at least one of a presence of communication traffic and a battery temperature to form a detection result, control an amount of a current to be used for the flash based on the detection result, and determine whether to use a predetermined maximum current value for the flash based on the battery temperature; and
a Light Emitting Diode (LED) configured to emit light depending on the controlled amount of the current.

12. The apparatus of claim 11, wherein the controller is further configured to detect a battery residual amount and consider the battery residual amount when controlling the amount of the current to be used for the flash.

13. The apparatus of claim 11, wherein when the communication traffic is not present, the controller is further configured to determine the amount of the current to be used for the flash using the predetermined maximum value, and when the communication traffic is present, the controller is further configured to determine the amount of the current to be used for the flash using a value less than the maximum value.

14. The apparatus of claim 12, wherein when detecting the battery residual amount, the controller is further configured to compare the battery residual amount with a predetermined threshold; when the battery residual amount is equal to or greater than the predetermined threshold, the controller is further configured to determine the amount of the current to be used for the flash using the predetermined maximum value; and when the battery residual amount is smaller than the predetermined threshold, the controller is further configured to determine the amount of the current to be used for the flash using a value smaller than the maximum value.

15. The apparatus of claim 11, wherein when detecting the battery temperature, the controller is further configured to compare the battery temperature with a predetermined threshold temperature; when the battery temperature is equal to or higher than a predetermined threshold temperature, the controller is further configured to determine the amount of the current to be used for the flash using the predetermined maximum value; and when the battery temperature is lower than the predetermined threshold temperature, the controller is further configured to determine the amount of the current to be used for the flash using a value smaller than the maximum value.

16. The apparatus of claim 11, wherein the controller is further configured to determine the amount of the current to be used for the flash based on the detection result, and comprises a flash driver configured to set the amount of the current to be used for the flash.

17. The apparatus of claim 11, wherein the controller is further configured to determine an operation mode of the flash based on the detection result and a flash driver is configured to determine to operate in the determined flash operation mode and wherein and the flash operation mode comprises at least one of a full emission mode for emitting flash light using a current corresponding to the predetermined maximum value and a torch mode for emitting flash light using a current corresponding to a value less than the maximum value.

18. The apparatus of claim 11, wherein the controller is further configured to measure a total amount of current used by the mobile terminal.

19. The apparatus of claim 18, wherein the controller is further configured to compare the total amount of current used by the mobile terminal with a predetermined threshold current amount, and determine the amount of the current of the flash depending on the comparison result.

20. The apparatus of claim 11, wherein the controller is further configured to determine whether a flash driver for the flash in the mobile terminal can control the amount of the current to be used for the flash, set the amount of the current to be used for the flash using the flash driver when the flash driver can control the amount of the current to be used for the flash, and change an operation mode of the flash to control the amount of the current to be used for the flash when the flash driver cannot control the amount of the current to be used for the flash.

* * * * *